United States Patent [19]

Grover

[11] Patent Number: 4,967,411
[45] Date of Patent: Oct. 30, 1990

[54] METHOD AND APPARATUS FOR FRAME-BIT MODULATION AND DEMODULATION OF DS3 SIGNAL

[75] Inventor: Wayne D. Grover, Edmonton, Canada

[73] Assignee: Alberta Telecommunications Research Centre, Alberta, Canada

[21] Appl. No.: 199,742

[22] Filed: May 26, 1988

[30] Foreign Application Priority Data

May 27, 1987 [CA] Canada .................................. 538090

[51] Int. Cl.⁵ ............................ H04J 3/04; H04J 3/06
[52] U.S. Cl. ............................... 370/110.1; 370/110.4; 370/105.1
[58] Field of Search .................. 370/110.1, 110.4, 100, 370/105, 105.1; 375/20, 111; 371/47

[56] References Cited

U.S. PATENT DOCUMENTS

| | | | |
|---|---|---|---|
| 4,243,930 | 1/1981 | DeCoursey | 370/110.4 |
| 4,387,460 | 6/1983 | Boutmy et al. | 370/110.4 |
| 4,404,675 | 9/1983 | Karchevski | 371/457 |
| 4,408,325 | 10/1983 | Grover | 370/110.4 |
| 4,430,731 | 2/1984 | Gimple et al. | 370/112 |
| 4,747,112 | 5/1988 | Blondeau, Jr. et al. | 375/20 |

Primary Examiner—Douglas W. Olms
Assistant Examiner—Min Jung
Attorney, Agent, or Firm—Sixbey, Friedman, Leedom & Ferguson

[57] ABSTRACT

A method of modulating a DS3 signal for addition thereto of an auxiliary, transparent signalling channel, the DS3 signal having framing bits which provide a predetermined pattern for which frame-finding circuits hunt to demultiplex the payload of the DS3 signal. The method comprises cyclically forcing an framing-bit error onto every D-spaced framing-bit of the DS3 signal during an initial ON period of an ON-oFF modulation cycle, the ON period and the modulation cycle having lengths such that no more than two verification attempts are required to complete reframing of the signal in the presence of the framing-bit modulation, and wherein the Modulation Spacing, D, is selected so as to provide a low probability of coincidence between the framing-bit Modulation Spacing and a verification window following a secondary reframing hunt.

42 Claims, 10 Drawing Sheets

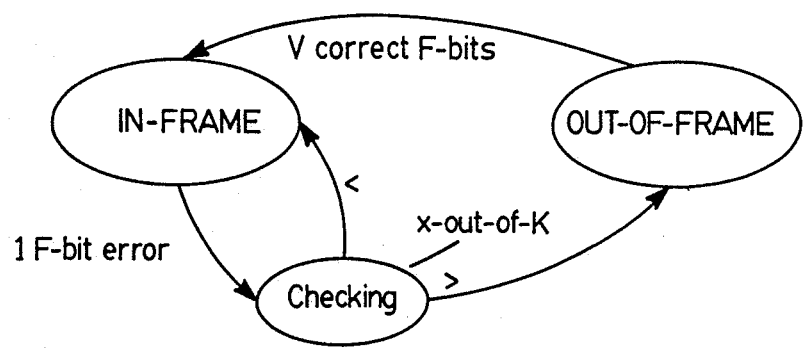
FIG. 2    Finite State Machine for F-bit Framing

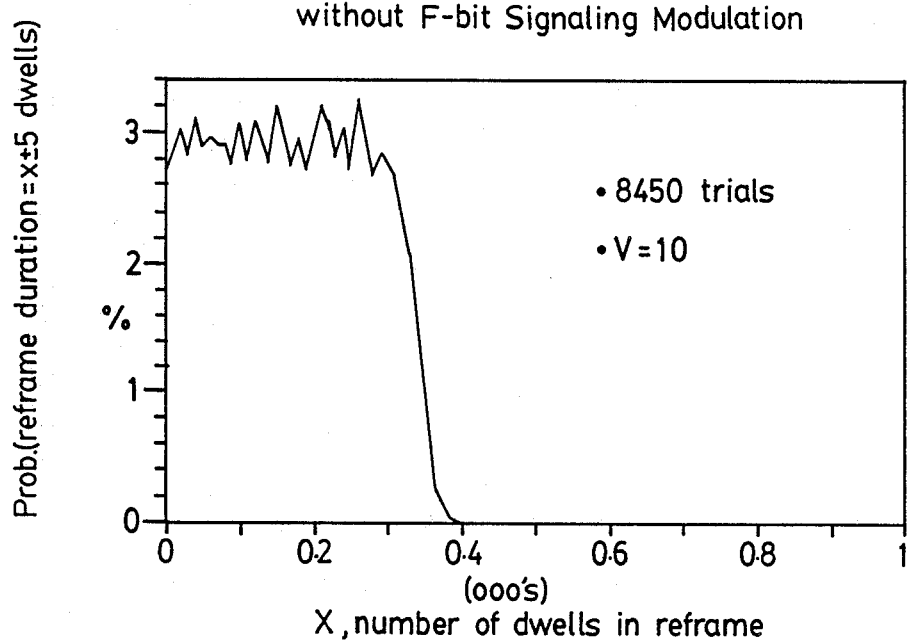
FIG. 3 PDF of REFRAME DURATION, X without F-bit Signaling Modulation
- 8450 trials
- V = 10
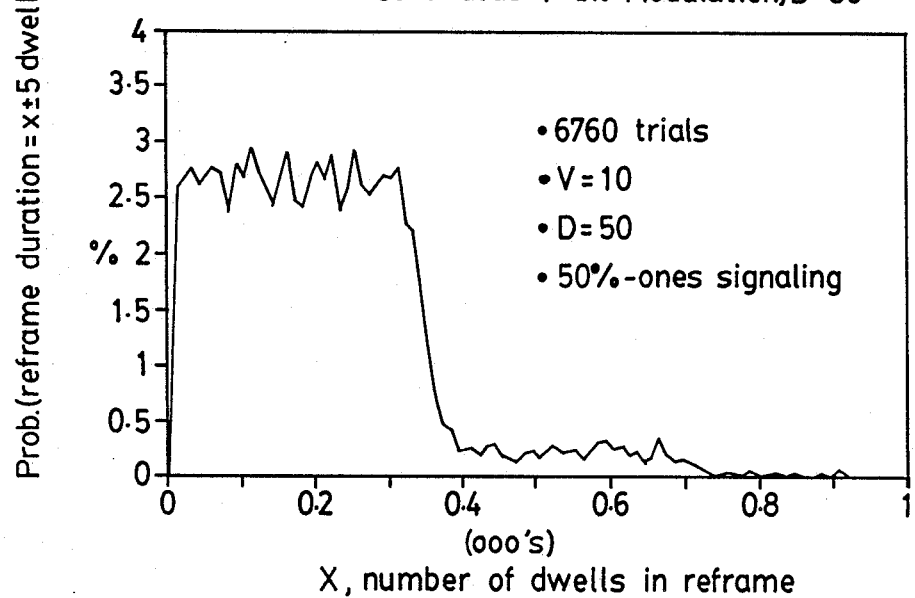
FIG. 4 PDF of REFRAME DURATION with Continuous F-bit Modulation, D=50
- 6760 trials
- V = 10
- D = 50
- 50%-ones signaling

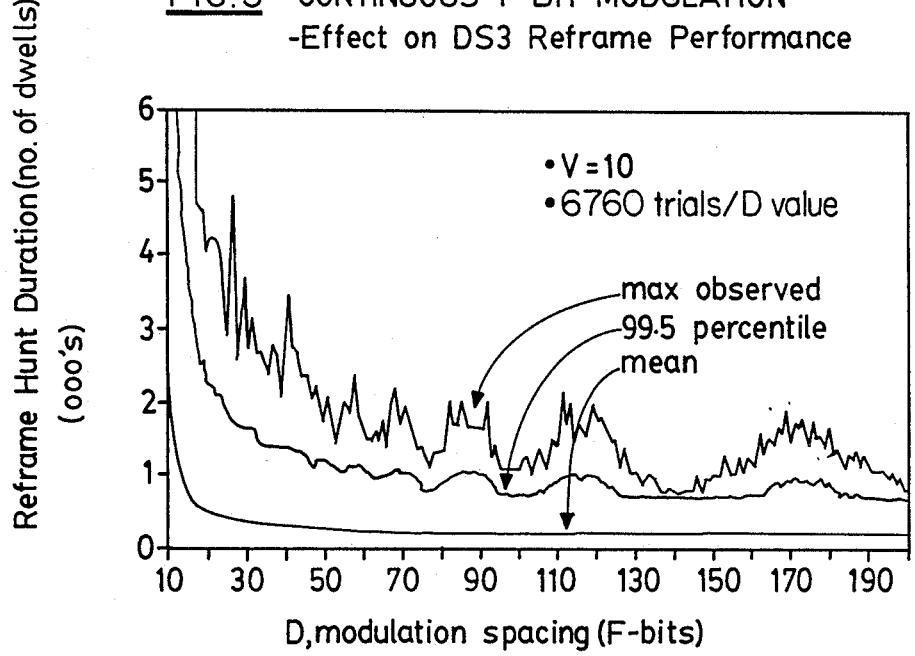
FIG.5 CONTINUOUS F-BIT MODULATION
-Effect on DS3 Reframe Performance
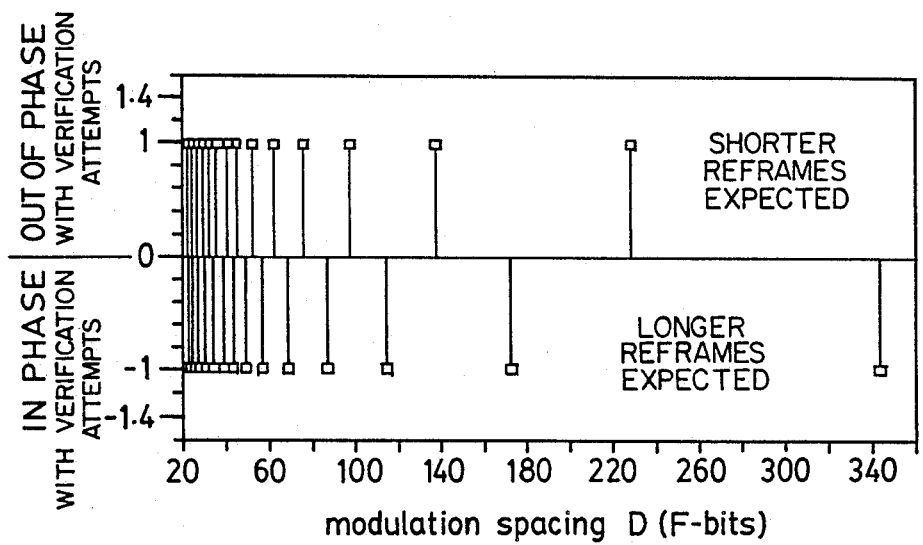
FIG.6 D-value COINCIDENCE with SECONDARY VERIFICATION ATTEMPTS (Underlying structure of Fig. 5)

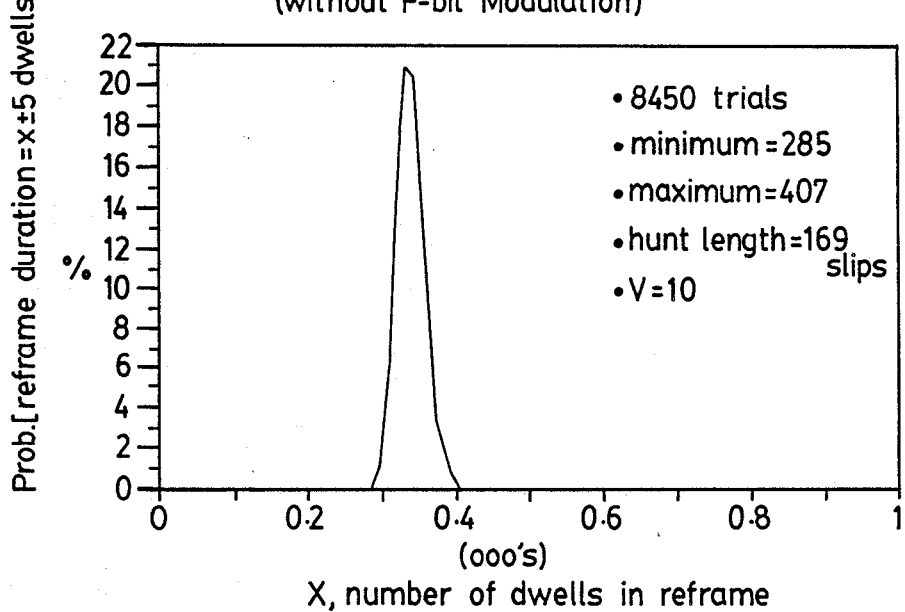
FIG.7 PDF of MAX. HUNT-LENGTH REFRAME (without F-bit Modulation)
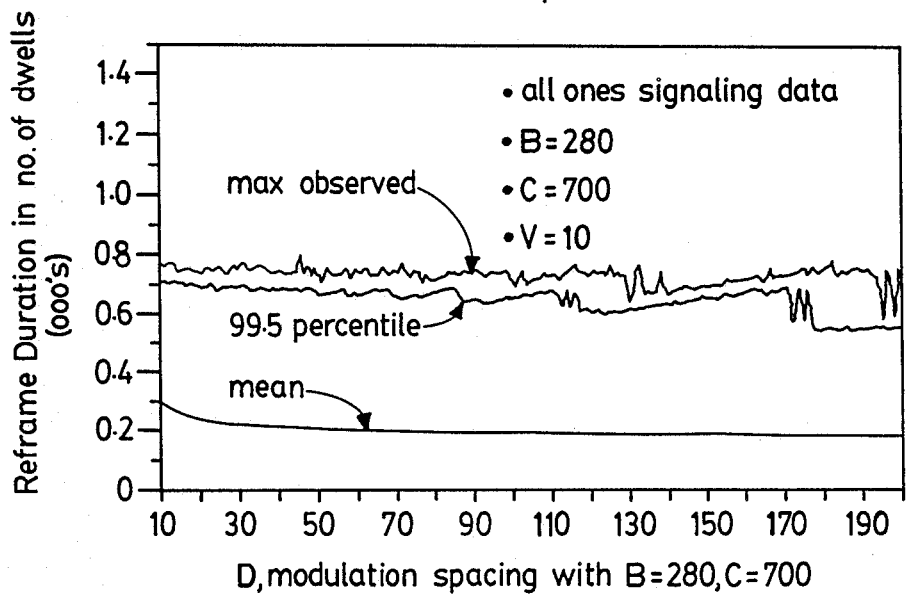
FIG.9 EFFECT of GATED F-BIT MODULATION on DS3 Reframe performance

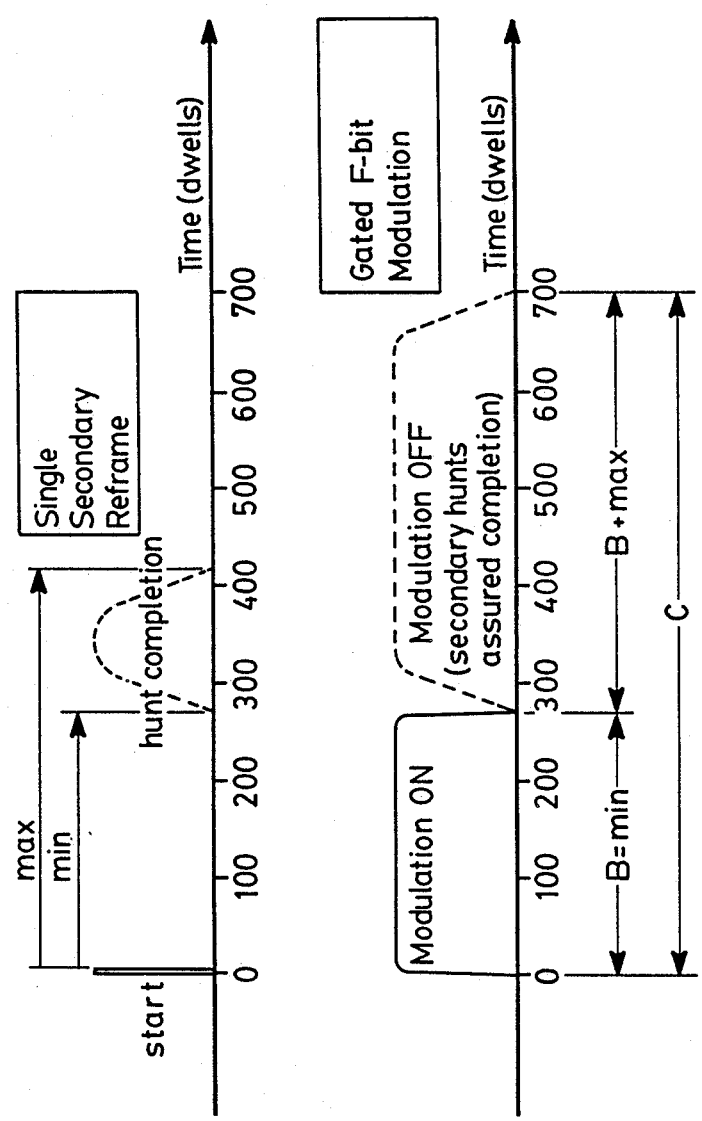
FIG. 8 Principle of Optimal Gated F-bit Modulation

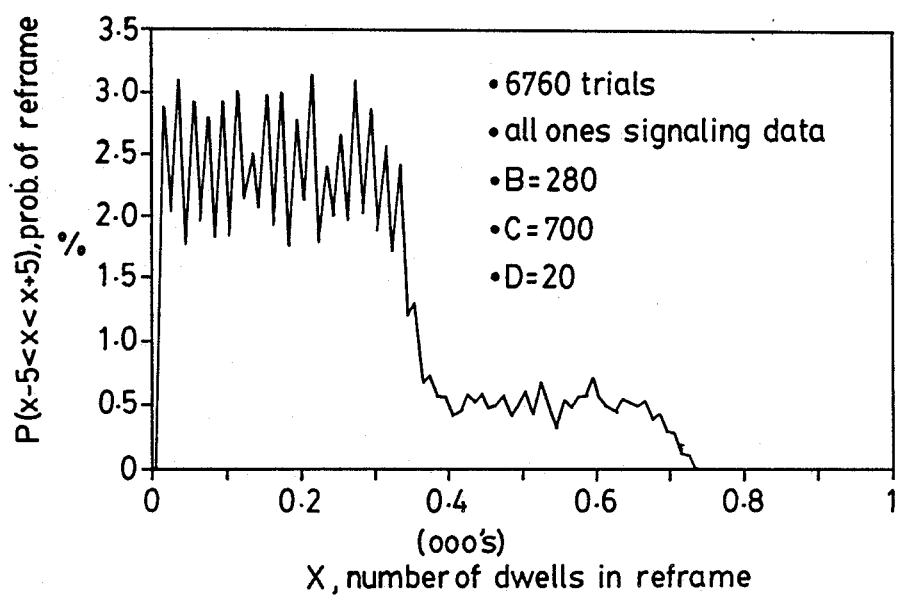

METHOD AND APPARATUS FOR FRAME-BIT MODULATION AND DEMODULATION OF DS3 SIGNAL

The present invention relates a method and apparatus for adding and extracting a transparent, auxiliary signalling channel to and from the framing bits of the DS3 signal standard.

BACKGROUND OF THE INVENTION

The present invention is motivated by desirable new applications which require channel-associated signalling facilities which were not anticipated in the original DS3 signal specification. Examples of such applications are (i) DS3 functional compatibility with new Sonet and Syntran signal formats which include dedicated signalling fields for advanced network maintenance and control functions; (ii) return path signalling for closed loop digital radio techniques such as intelligent antenna control and adaptive transmit power control; and (iii) signal-associated restoration signature transport to implement a distributed realtime network restoration with new digital cross-connect machines.

SUMMARY OF THE INVENTION

In accordance with one aspect of the present invention, there is provided a method of modulating a DS3 signal for addition thereto of an auxiliary, transparent signalling channel, the DS3 signal having framing bits which provide a predetermined pattern for which frame-finding circuits hunt to demultiplex the payload of the DS3 signal. The method comprises cyclically forcing a framing-bit error onto every D-spaced framing-bit of the DS3 signal during an initial ON period of a modulation cycle, the ON period and the modulation cycle having lengths such that no more than two verification attempts are required to complete DS3 reframing of the signal in the presence of the additional modulation, and wherein the Modulation Spacing, D, is selected so as to provide a low probability of coincidence between the framing-bit Modulation Spacing and a verification window following a secondary reframing hunt.

In accordance with another aspect of the present invention, there is provided a frame-bit modulation circuit for adding an auxiliary, transparent signalling channel to a DS3 signal, the DS3 signal having framing bits which provide a predetermined pattern for which frame-finding circuits hunt to demultiplex the payload of the DS3 signal. The circuit comprises register means for holding a digital word, consisting of a predetermined number of digital bits, of a signal to be modulated into and transmitted via the auxiliary channel, and means for serially adding the digital bits to sequentially D-spaced framing-bits of the true framing-bit pattern of the DS3 signal during the ON period of a modulation cycle having an ON period and an OFF period.

In accordance with still another aspect of the present invention, there is provided a frame-bit demodulation circuit for demodulating F-bit errors in the F-bit channel of a DS3 signal. The circuit comprises means for examining successive triplets of F-bits from a framing circuit to locate F-bit errors in the F-bit channel of the DS3 signal and outputing a decoded F-bit error signal, phase locked divider circuit means for locking onto the phase of D-spaced F-bit signalling errors and rejecting a predetermined number, T, of F-bit errors which are out of phase, output register means for holding a true signalling F-bit error signal, and means for producing a clock signal corresponding to the phase determined by the phase locked circuit means for strobing the true F-bit error signal into the register.

BRIEF DESCRIPTION OF THE DRAWINGS

These and other features of the invention will become more apparent from the following description in which reference is made to the appended drawings, wherein:

FIG. 2 illustrates a state machine for use in carrying out the functions of F-bit frame-finding, out-of-frame-detection and reframe hunting;

FIG. 3 is a graph showing an approximation to p(x), normal reframe hunt duration, obtained by computer simulation of 8450 independent reframes starting from random positions;

FIG. 4 is a histogram illustrating the simulation-derived frequency distribution of reframe times with D=50, V=10 and 50%-ones F-bit signalling data;

FIG. 5 is a graph showing mean and maximum points of a large number of histograms similar to that of FIG. 4 but for 191 values of D from 10 to 200 using 6760 trials for each value;

FIG. 6 is a diagram illustrating D-value coincidence with secondary verification attempts, the mechanism of long reframes;

FIG. 7 is a histogram illustrating the full probability density function (pdf) of reframe duration, excluding verify time, for a specific maximum hunt length of 169 bits;

FIG. 8 is a diagram illustrating principles which lead to two constraints for modulation ON duration, B, and total modulation ON-OFF cyclewidth, C, for a gated F-bit modulation strategy so as to avoid reframe extension;

FIG. 9 is a histogram illustrating the effects of gated F-bit modulation on reframe duration statistics depending on D;

FIG. 10 is a histogram illustration the pdf of individual reframe durations for gated F-bit modulation with D=20 showing strict truncation of the pdf tail;

DESCRIPTION OF PREFERRED EMBODIMENT

Before proceeding with the description of the present invention, the current DS3 specification and requirements for a new signalling channel will be reviewed.

THE DS3 FORMAT

The DS3 format is currently the North American standard for the third level in the digital transmission hierarchy. It was defined over a decade ago when the network was completely asynchronous and it is now the ubiquitous 44.736 Mb/s standard interface for commercial digital radio and fiber optic transmission systems.

Figure 1:
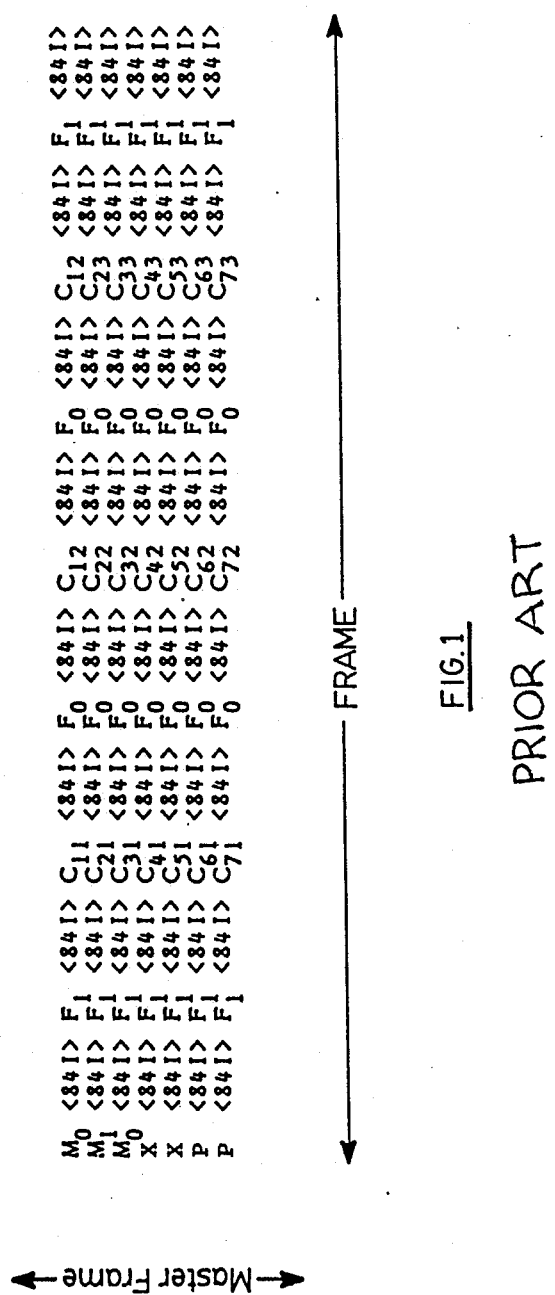
FIG. 1 illustrates the structure of the DS3 signal.

FIG. 1 shows the structure of the DS3 signal. The bold characters are the 'housekeeping' (HK) bits which give the format its structure. Between each pair of HK bit are 84 tributary payload bits, denoted (84I). The payload bits are a multiplex of seven plesiochronous DS2 tributaries, transported through a pulse-stuffing synchronization technique. Each DS2 (6.312 Mb/s ±30 ppm) is itself a pulse-stuffed multiplex of four plesiochronous DS1s (1.544 Mb/s). Each DS1 is a synchronous interleaving of 24 DS0 channels (64 kBs). Because of this two-stage asynchronous multiplexing, a fundamental property of the DS3 format is that individual DS0 or DS1 payloads are not observable at DS3. Complete two-stage demultiplexing is required to identify these payloads.

DS3 FRAME FORMAT

The $F_1$ and $F_0$ bits are the primary frame-finding bits, called 'F-bits'. The F-bits provide a fixed repeating framing pattern for which frame-finding circuits hunt in order to demultiplex the payload. Because the data can mimic this pattern, frame-finding in DS3 is inherently stochastic and relies on disqualification of candidate frame-bit positions when they do not match the required frame-pattern. Only the true F-bit location will consistently exhibit the 1-0-0-1 pattern and this makes it identifiable.

When the 1-0-0-1 F-bit pattern is found, the arrangement of individual frames into a masterframe is required. The masterframe serves to identify the tributary to which each set of three stuff-control C-bits pertain. Masterframe position is usually found within one masterframe time of F-bit framing by decoding the $M_0$-$M_1$-$M_0$-X-X-P-P pattern. $M_1$ and $M_0$, (M-bits), are fixed 1 and 0 values. P is parity over the preceding masterframe and X is a signalling bit reserved for customer access. X and P are random but PP and XX denotes their duplication.

$C_{j1}$-$C_{j2}$-$C_{j3}$ indicate the presence or absence of a stuffed pulse in frame j. Pulse stuffing synchronization is the method used to accommodate asynchronism in the input tributaries. The actual rate per tributary in the DS3 frame is 6.3157 Mb/s, and the inputs are at 6.312 Mb/s ±30 ppm. The difference frequency is made up by transmitting "stuff" bits as required for each tributary. The first frame provides a stuff opportunity for tributary 1 and so on. A stuff bit for the jth tributary is indicated by $C_{j1}=C_{j2}=C_{j3}=1$ and the 1st bit for the tributary j in subframe 7, is the location of the stuffed bit. If $C_{j1}=C_{j2}=C_{j3}=0$ then the stuffbit location contains a data bit for the tributary.

C-bits are triplicated and majority logic-detection is employed as a simple means providing single-bit error correction on C-bits. C-bits warrant this protection because the consequence of an error in stuffing control is a guaranteed reframe of all lower speed multiplexers in the transmission hierarchy. FIG. 1 only shows the organization of the DS3 payload. (Electrically the DS3 signal is specified as an unbalanced 75 ohm bipolar signal with B3ZS zero substitution code.

THE SYNTRAN (DS3s) FORMAT

Syntran is a new DS3-rate digital signal defined as a draft American National Standard (April, 1985) for transmission in synchronous networks using DS3-compatible facilities. Syntran restructures the DS3 payload to allow direct DS0 and DS1 observability in the high speed bit stream. Reformatting the DS3 signal for a synchronous mode removes the current two-stage asynchronous stuffing process to permit simpler add/drop arrangements for digital cross-connect systems. The Syntran signal will be compatible with existing DS3 transmission facilities but will be incompatible with today's asynchronous DS3 multiplexers.

Most of the changes that Syntran introduces pertain to the definition of a synchronous superframe spanning 699 of the conventional masterframes and reorganizing the payload bits in these 699 masterframes into 595 125 μsec subframes at the standard 8 Khz network pcm frame-rate. For the purposes of extracting a signalling channel common to Syntran and DS3, only the impact of Syntran at the masterframe level and below, where the two have a common foundation, need be considered.

The only change Syntran makes below the masterframe structure pertains to the C-bits and the stuffed data bits. Because Syntran assumes synchronous DS0 or DS1 inputs, it has no need for the pulse-stuffing mechanism and it frees the C-bits and the stuff bits for other uses such as M-frame numbering and CRC-9 performance monitoring. In their Syntran role, the C-bits are no longer triplicated and the stuffed bits disappear.

SIGNALLING CHANNEL REQUIREMENTS

Applications for a new DS3 signalling channel have the following requirements:
1. Transparency: The signalling channel must be invisible, and without deleterious effect, to any existing DS3 equipment or new DS3 equipment that is not designed to process the new channel.
2. Payload Association: The signalling channel must be derived so that signalling messages transit the entire network, including all processing that the payload undergoes, without separating signalling from payload.
3. Syntran Compatibility: The signalling method should be identical whether the payload is organized in the Syntran format or the conventional DS3 format. This permits all spare transmission links physically compatible with DS3 transmission to be available for restoration of either form of payload in a network and the design of DS3 crossconnect machines that are signalling-compatible with both types of DS3 without risk from further change in the Syntran specification. In addition, applications such as transmit power control in digital radio should be independent of the payload structure.

NORMAL F-BIT FRAMING

The following description reviews the normal behaviour of the F-bit framing process. The functions of F-bit frame-finding, out-of-frame-detection and reframe hunting are managed by a state machine as shown in FIG. 2. Behaviour is a follows:

Loss of frame detection: In order to avoid spurious reframes due to line transmission errors, F-bit framing invariably uses an x-out-of-K framing error density criteria for determination of loss-of-frame. 4-out-of-12 is a typical design. F-bit errors are decoded when an F-bit fails to follow the 1-0-0-1 pattern in the phase adopted when the system entered the in-frame state.

Reframing hunt: A reframe hunt begins when the framing circuit enters the out-of-frame state. The hunt for the framing pattern proceeds by dwelling on a candidate bit position until that position violates the 1-0-0-1 pattern when sampled at the F-bit interval. When this occurs, a slip to the next candidate bit position is done and the process is repeated. By collecting preview values of the next two candidate positions, or by parallel implementation of 4 pattern-detection registers, it is possible to achieve an average slipping rate of 1 slip/2 dwells in random data ($P_{slip}=0.5$). This average slip rate must be achieved by any implementation which meets the maximum-length reframe hunt-time specification. Hunting is (normally) complete when the number of slips generated is equal to the distance the frame hunt started from the true F-bit position.

For a framing hunt that starts from a uniformly distributed position within the distance between F-bits (N bits apart), the probability of exactly x dwells in any given reframe is:

$$P(x) = \frac{1}{(N-1)} \sum_{i=1}^{N-1} p_i(x,i) \quad (1)$$

$$\text{where } p_i(x,i) = \begin{cases} 0 & \ldots; \ x < i \\ \frac{x!}{i!(x-i)!}\left[\frac{1}{2}\right]^{(x+1)} & \ldots; \ x \geq i \end{cases}$$

FIG. 3 shows an approximation to P(x) obtained by computer simulation of 8450 independent reframes starting from random positions. The mean reframe time is 170 dwells and the 99.5 percentile reframe was 355 dwells. The maximum reframe observed in the 8450 trials was 407 dwells. These values provide the benchmark of normal performance against which the impact of F-bit modulation on reframe statistics can be assessed later.

In-frame Validation: In normal operation, when the frame hunt arrives on the true F-bit position, the F-bit errors which have been driving the hunt will cease. The framing circuit does not know it is at the frame-position but at any time during the hunting state if a number of dwells, V, transpires without a single slip, the transition to the in-frame state occurs. If this transition is erroneous, the hunt will soon be re-initiated, otherwise this property serves to lock onto the true framing position. Values of V are not usually higher than 20 and in practice values as low as 8 work well. It is to be noted that, during the validation phase, the framing process is extremely vulnerable. A single error during this time is still decoded into a slip command, forcing the hunt all the way around again.

F-BIT ERROR MODULATION

In accordance with the present invention, it is proposed to convey signalling information bits as single errors forced on the F-bit pattern. A logical one in the auxiliary signalling stream will cause a complement operation on the next outgoing F-bit available for modulation. A logical zero causes no F-bit errors. As described later, signalling-bit, signalling-word synchronization and resistance to transmission errors can be achieved in a relatively simple circuit which processes the F-bit error output of an existing DS3 framing circuit.

The effects of F-bit modulation on system performance will be (i) on the statistics of reframe time, and (ii) on the probability of spontaneous reframe due to line errors. The first effect is of most concern. The second effect is insignificant at normal BER levels but is estimated later. Clearly, if every F-bit was made eligible for signalling modulation, a complete failure to reframe would occur, not because hunting would be affected, but because the verification criteria would always fail. The spacing between F-bits that are eligible for signalling modulation is herein referred to as the "modulation spacing", D. It is important to note that F-bit modulation does not extend reframe time by affecting the reframe hunting process, but by defeating a potentially successful reframe during the vulnerable period when the current candidate is the F-bit position and the required number of V dwells without an error is not yet complete. If verification fails here due to signalling modulation, the reframe is extended by slipping off the true F-bit position and continuing to hunt. When this occurs, a maximum length hunt (rather than a random length hunt) follows because the start was the true framing position and hunting must proceed forward to the next F-bit position.

In order to statistically quantify, the extension of reframe time as a function of the modulation spacing, a circuit-level computer simulation was constructed of the F-bit frame-finding process subject to signalling-induced F-bit errors. The simulation generated a uniformly distributed starting point within the range of hunt distances possible in DS3 (1 to 169) and simulated random slipping ($P_s=0.5$) through the data field towards the framing-bit position. The true F-bit position has the correct F-bit pattern and every D-spaced F-bit was subject to signalling modulation (exoring) according to various strategies. All-ones and random 50%-ones signalling data was modeled. The phase of the D-spaced F-bit modulation was randomized with respect to the start of the framing hunt at the beginning of each trial.

The simulation used a verification window of $V=10$ F-bits. This representative value was used throughout. For other values of V in the range 5 to 20, it was expected that all of the following results would be substantially accurate if the D axis is reinterpreted as $(D/V)*10$. This is because the general result is dependent to a first order on the probability of an individual verification failure (V/D ratio), not the actual size of V. V was fixed, however, to facilitate direct interpretation of results in terms of signalling rate ($=D/170)*44.736 \times 10^{+6}$).

Verification was attempted when the hunt arrived at the true F-bit location. If an F-bit error occurred during verification, another hunt began but with the maximum length hunt distance of 169 bit positions. Eventually another verification was attempted, and the procedure repeated until a successful verification was completed.

The total number of dwells on candidate F-bits was recorded until the in-frame state was reached. Each run of the simulation performed 6760 individual reframe experiments, unless noted otherwise, and the resulting times-to-reframe were statistically characterized by a fine resolution histogram approximating the pdf, the mean value, the maximum observed reframe and the 99.5 percentile reframe duration. Each F-bit dwell in this simulation represents 3.8 μsec of realtime (170 bits/44.736 Mb/s).

FIG. 4 shows the simulation-derived pdf of reframe times with $D=50$, $V=10$ and 50%-ones F-bit signalling data. $D=50$ yields an F-bit signalling channel of 5.26 Kb/s. The main effect of the F-bit modulation is the significant tail on the pdf of reframe duration when compared to the normal pdf (FIG. 3). The tail of the pdf is due to cycling through repeated reframe hunts when verification fails from signalling related F-bit errors. The probability of verification failure in this run was 8.5%, less: than the value predicted by $(V/D)/2=10\%$.

The difference is attributable to effects due to the dynamics of reframing as discussed below.

To examine the wider dependency of reframe performance on the F-bit modulation spacing D, there was generated the equivalent pdf of FIG. 4 for 191 values of D from 10 to 200 using 6760 trials for each value. The mean reframe duration, the 99.5 percentile reframe duration and the maximum observed reframe duration for each D-value were recorded and these are shown in FIG. 5.

With reference to FIG. 5, it will be seen that F-bit modulation with D as low as 20 does not significantly affect the mean reframe duration. In practice, however, the maximum reframe that may occur must be considered because this determines the risk of call-dropping or call-state disruption due to DS1 A/B signalling bit corruption during the DS3 reframing event. On this basis, continuous D-spaced F-bit modulation degrades the DS3 reframing process by generating reframes 3 to 10 times longer than would otherwise occur even at low F-bit modulation densities. This may not be acceptable for some applications but still provides a useful auxiliary signalling channel in applications where reframe time is not a concern, or where it is known that auxiliary data transmissions are infrequent enough to have negligible chance of coincidence with a reframe attempt in downstream equipment. Also, continuous F-bit modulation would be used at higher D-values to provide simple "marking" of a DS-3 for test purposes. In practice, continuous F-bit modulation will be adequate in many applications, especially because the mean reframe time is almost unaffected above D=30. The description proceeds to a more advanced form of F-bit modulation strategy that not only provides the same low mean reframe time but also strictly controls the maximum duration as well.

The undulations in FIG. 5 were found to result from the dynamics of the reframing process, an understanding of which leads to the optimised F-bit modulation technique as discussed hereinbelow.

REFRAMING DYNAMICS

The apparent existence of good D-values (100 and 140 in FIG. 5) and, particularly, bad D-values (around 90,120,170) is due to (i) the fact that when a verification failure occurs at the end of a random-length initial hunt, a fixed length hunt requiring exactly 169 slips is guaranteed to follow, and (ii) the F-bit modulation interval and the reframing hunt start are momentarily synchronized by their coincidence in the V-interval. Since the probability of generating a slip on any dwell is 0.5, it will take an average of 338 dwells to slip the 169 positions that return the candidate F-bit position to the true framing position. Therefore, with verification taking 10 F-bits, any D value given by $(338+5)/n$, where n is a positive integer, will tend to produce repeated verification failures because F-bit errors are no longer uniformly likely but tend to occur exactly in the middle of the next verification window.

Similarly, D values given by $(338+5)/(n-1/2)$ will tend to a low probability of long reframes because the F-bit error positions tend to straddle the region where secondary reframe hunts terminate. FIG. 6 attempts to summarize this concept and shows, for example, why D=140 should perform relatively well while D=174 is worse, even though fewer F-bits are modified at the larger D spacing.

The foregoing shows that long reframes can be minimized by a choice of D-value that results in a low probability of coincidence between the F-bit modulation spacing and the verification window following a secondary hunt. In order to further exploit this effect, the full pdf of reframe duration, excluding verify time, for a hunt length of 169 was obtained and is shown in FIG. 7. The significant width of this pdf extends from 285 to 405 dwells and the peak is at 338 dwells. In conjunction with FIG. 7, FIG. 6 also explains why the undulations in FIG. 5 decrease at low D values, i.e., the spacing between good and bad D-values becomes small compared to the width of the maximum length reframe pdf.

For an optimum F-bit modulation strategy, the present invention exploits the synchronization effect between F-bits and the known length of the secondary reframe hunt and make use of the maximum length reframe pdf (FIG. 7) as explained below to determine a modulation strategy that guarantees no more than two verification attempts to complete reframing. FIG. 7 shows that a maximum-length reframe hunt virtually never is completed in under 285 dwells. Accordingly, if F-bit errors are applied over a burst of 285 F-bits and then stop, all secondary reframes would occur outside of this burst.

The position of triggering a secondary hunt anywhere in the burst region is a uniform random variable, $X_1$. If the pdf of secondary hunt duration (FIG. 7) is approximated as a rectangle between 285 to 405 dwells, with random variable (rv) $X_2$, then the convolution of these pdf's gives the pdf of $(X_1+X_2)$. This is the region where secondary reframe verification attempts will occur. FIG. 8 summarizes these principles and shows how they lead to two constraints for modulation ON duration, B, and total modulation ON-OFF cyclewidth, C, for a gated F-bit modulation strategy:

(i) ON duration (B)$\leq$285
(ii) Cyclewidth (C)$\geq$ON duration+405

The solution to the above inequalities that gives the highest ON duty-cycle is C=690 and B=285. For additional margin, B=280 and C=700 were used and the results were repeated for reframe statistics versus D. In these results (FIG. 9), the D-value is the modulation spacing during the ON phase. During the OFF phase, no F-bits are altered. FIG. 9 shows that 280/700 gating gives a dramatic improvement compared to continuous D-spaced F-bit modulation (FIG. 5) and appears to guarantee a maximum reframe duration of under 800 dwells, regardless of D-value during the ON portion of the gating cycle. The mean reframe duration is typically 200 dwells (0.76 msec), up only 20% from the mean without F-bit signalling. The 99.5 percentile reframe is under 700 dwells (2.7 msec) up less than 100% from the system with F-bit modulation.

To confirm the pdf-tail-truncation mechanism, the pdf of individual reframe durations for gated F-bit modulation with D=20 were re-examined and are illustrated in FIG. 10. This is equivalent, on a signalling-throughput basis, to the continuous D=50 pdf in FIG. 4 and clearly shows the anticipated truncated pdf tail.

It will be seen therefore that with gated F-bit modulation, F-bit errors can be used to convey signalling information and the extension of reframe times is controlled to a maximum of one excess frame-hunting iteration for modulation spacings as low as every tenth F-bit. As such, reframe extension is no longer the limiting factor for signalling modulation capacity. The limiting factor becomes the need to not trigger a false reframe in a correctly framed system. This means in practice that $D \geq K$ is required where x-out-of-K is the loss-of-frame criteria, typical values being from 8 to 12.

Separate calculations show that the effect of $D=13$ F-bit modulation in a system with a 4-out-of-12 frameloss criteria is a reduction in the threshold-BER for 1 spontaneous reframe per day, from near $5 \times 10^{-3}$ to near $5 \times 10^{-5}$. Since $5 \times 10^{-5}$ is a maintenance-requiring BER in any case, this effect is not considered major. At usual BERs of below $10^{-8}$, spontaneous reframe rates are below 1 per thousand years, with or without F-bit modulation, and so are not a practical concern.

In conclusion, gated F-bit modulation with $D=13$ during an ON period on 280 F-bits repeating cyclically every 700 F-bits is a viable means by which to provide a transparent signalling channel in the DS3 format and which meets the requirements given above. The capacity of the signalling channel example derived in this example is:

$$(280/700) * 44.736 \times 10^{+6} / (170*13) = 8.097 \text{ Kbs.}$$

Figure 11:
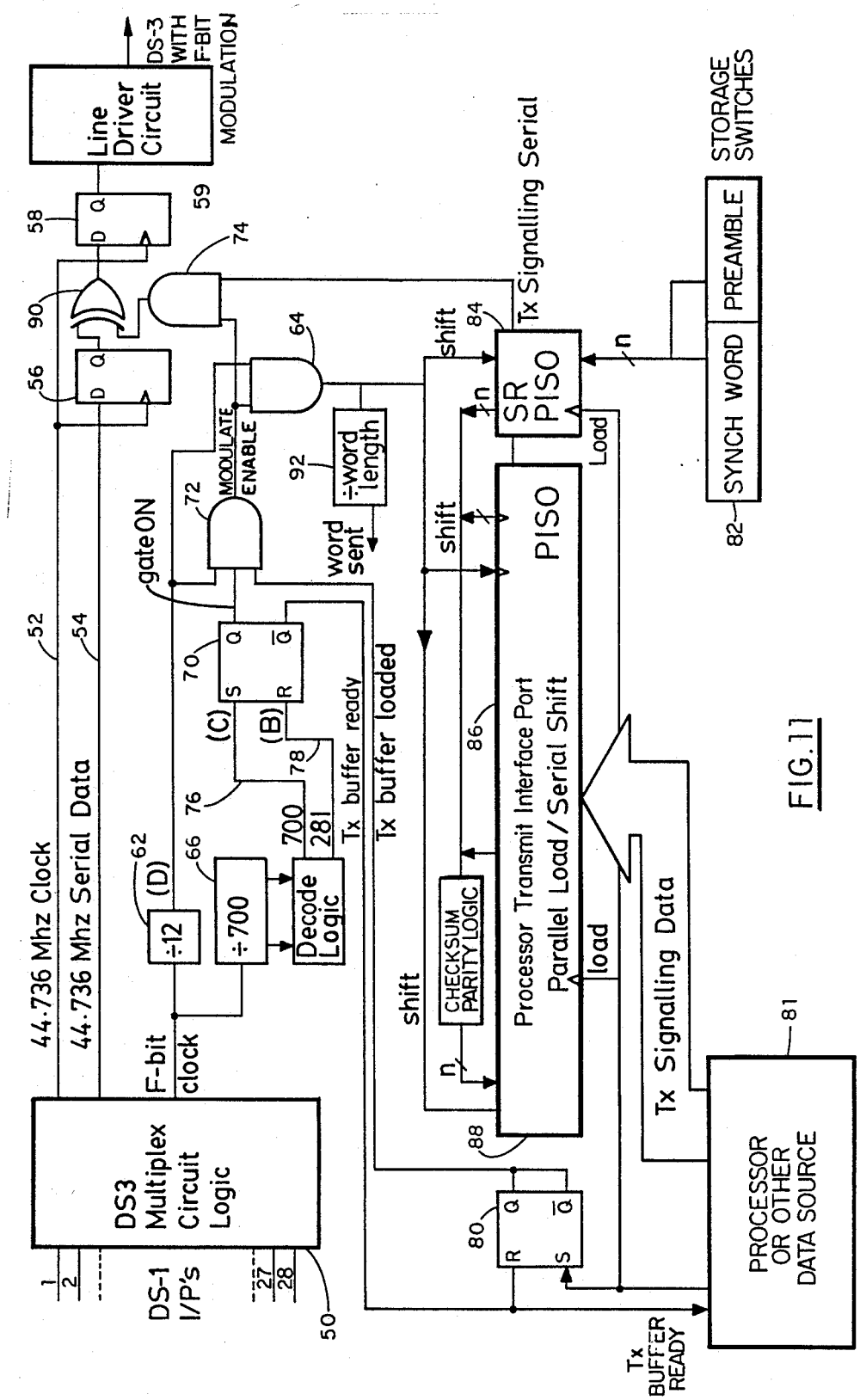
FIG. 11 illustrates a basic F-bit modulation circuit and a circuit interface for asynchronous word transmission over the F-bit link.
Figure 12:
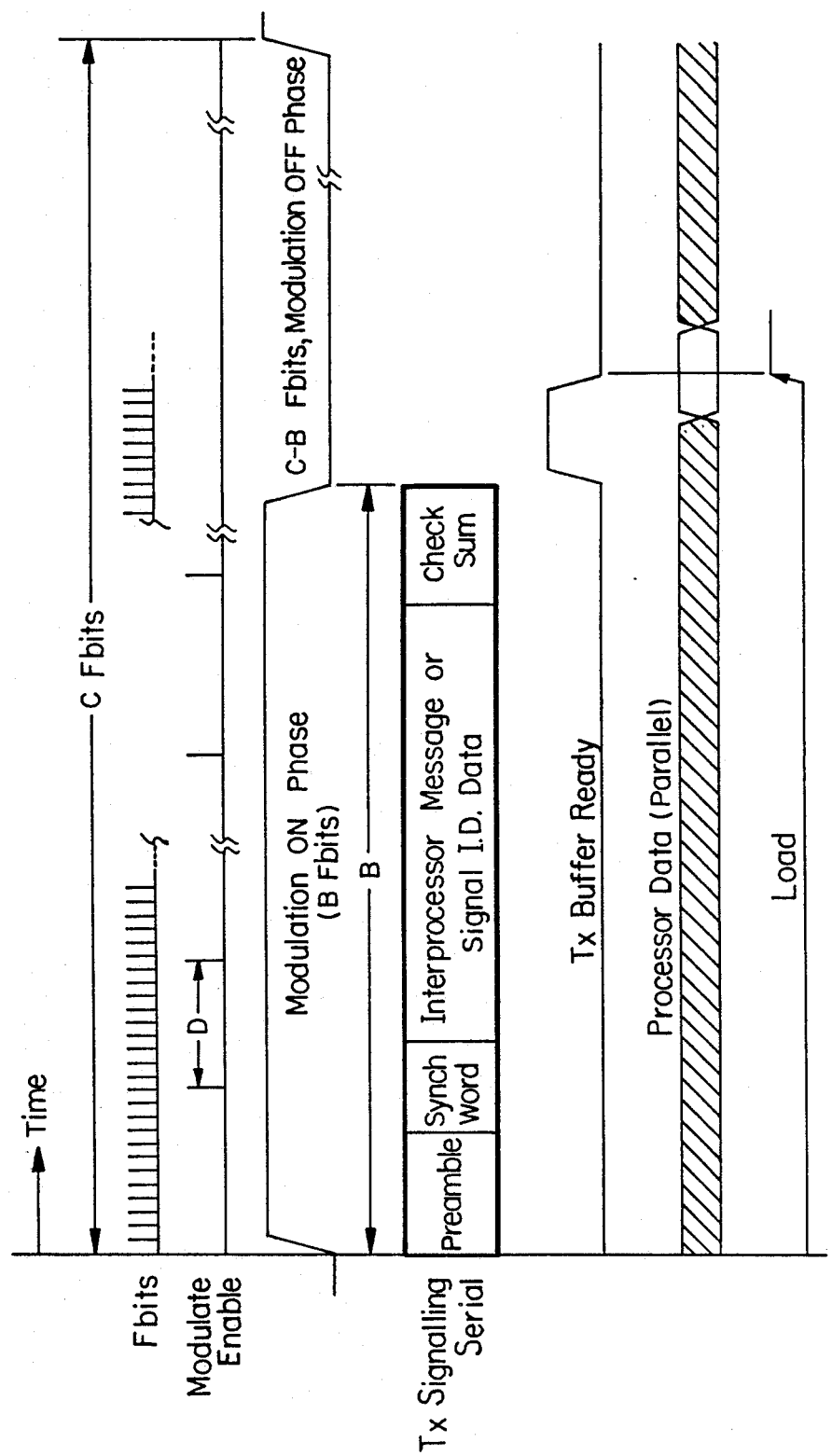
FIG. 12 illustrates a basic format of the transmit signalling data applied to the F-bits.

FIG. 11 illustrates an F-bit modulation circuit and a circuit interface for asynchronous word transmission over the F-bit link while FIG. 12 illustrates one possible format of the transmit signalling data applied to the F-bits.

The particular circuit shown permits a processor interface to load transmit data any time during the OFF phase of the gated F-bit modulation cycle by checking the "ready" line produced by SR-FF 70. If the processor does load data, then the next modulation ON phase is used to serially transmit the word that was loaded. This approach is simple because it avoids the requirement for the F-bit signalling receiver to acquire the B/C ON/OFF cycle envelope phase so that the OFF phase is not erroneously received as F-bit modulation of binary zero values. This means that the complete length of the transmitted word must be less than or equal to the nearest integer below B/D with the circuit of FIG. 11. With the preferred $D=12$, $B=280$ modulation, the maximum word length would be 23 bits. As shown in FIG. 12, a word comprised of 2 bytes data (16 bits), 2 bits checksum, a 5 bit synch word and a 5 bit preamble would total 28 bits and would require a continuous modulation burst of 336 F-bits (with $D=12$). Results have shown that $B=336$ has an insignificant effect on the extension of reframe times and, accordingly, the ON phase can be extended from the preferred $B=280$ F-bits to $B=336$ F-bits without adversely affecting the performance of the present invention.

With particular reference to FIG. 11, an existing DS3 multiplex circuit logic 50 transmits a 44.736 Mhz clock signal over line 52 to D-Flip Flops 56 and 58, serial data at a rate of 44.736 Mbs to D-Flip Flop 56 over line 54 and an F-bit clock signal over line 60 to each of a $\div 12$ Counter 62, AND gate 64 and a $\div 700$ Counter 66. The F-bit clock from the existing DS3 multiplex circuit is in the form of a one bit wide pulse at 44.736 Mhz, marking every F-bit in the high speed stream. Counter 62 applies an output to an AND gate 72 every 12th F-bit. A decode logic circuit 68 receives the output of $\div 700$ Counter 66 and applies an output along line 76 to Set-Reset FF 70, every 700 F-bits and along line 78 when the 281st F-bit occurs during the count to 700. Gate 72 applies a modulate enable output to AND gates 64 and 74, every 12th F-bit when the F-bit count is less than 281 and when BUFFER LOADED is indicated by SR-FF 80. SR-FF 70 applies a $T_x$ BUFFER READY signal for use by the transmitting data source and resets SR-FF 80 when the F-bit count during each cycle is greater than 280 at which time the ON cycle of modulation is over. A storage register 82, comprised of a fixed synch word and preamble data buffer 86 and a checksum or parity register 88, is provided for holding the word to be transmitted. Registers 84, 86 and 88 are serial connected PARALLEL INPUT/SERIAL OUTPUT registers. During the GATE ON period, gate 64 causes the buffers to shift and a bit to be transmitted to gate 74 which in turn applies its output to an EXCLUSIVE OR gate 90. The EXCLUSIVE OR gate adds (modulo -2 addition) the shifted output from the transmit register to the original F-bits, causing an F-bit error for each logical 1 in the transmitted word. Thus, a logical zero input to gate 90 would cause no F-bit errors. Gate 90 applies its output, a DS-3 signal with modulated F-bits, to the existing line driver circuit 59. Gate 64 also applies its output to a $\div$ WORD LENGTH counter 92 which signals the processor when the entire word has been transmitted in the event that the word length does not correspond to the full B interval.

When the processor detects the $T_x$ BUFFER READY signal from gate 70, it loads buffer 86 and the loading strobe causes the preamble sequence, the synch sequence and checksum (parity) to be also loaded into their respective registers 84 and 88 prior to shifting out.

Figure 13:
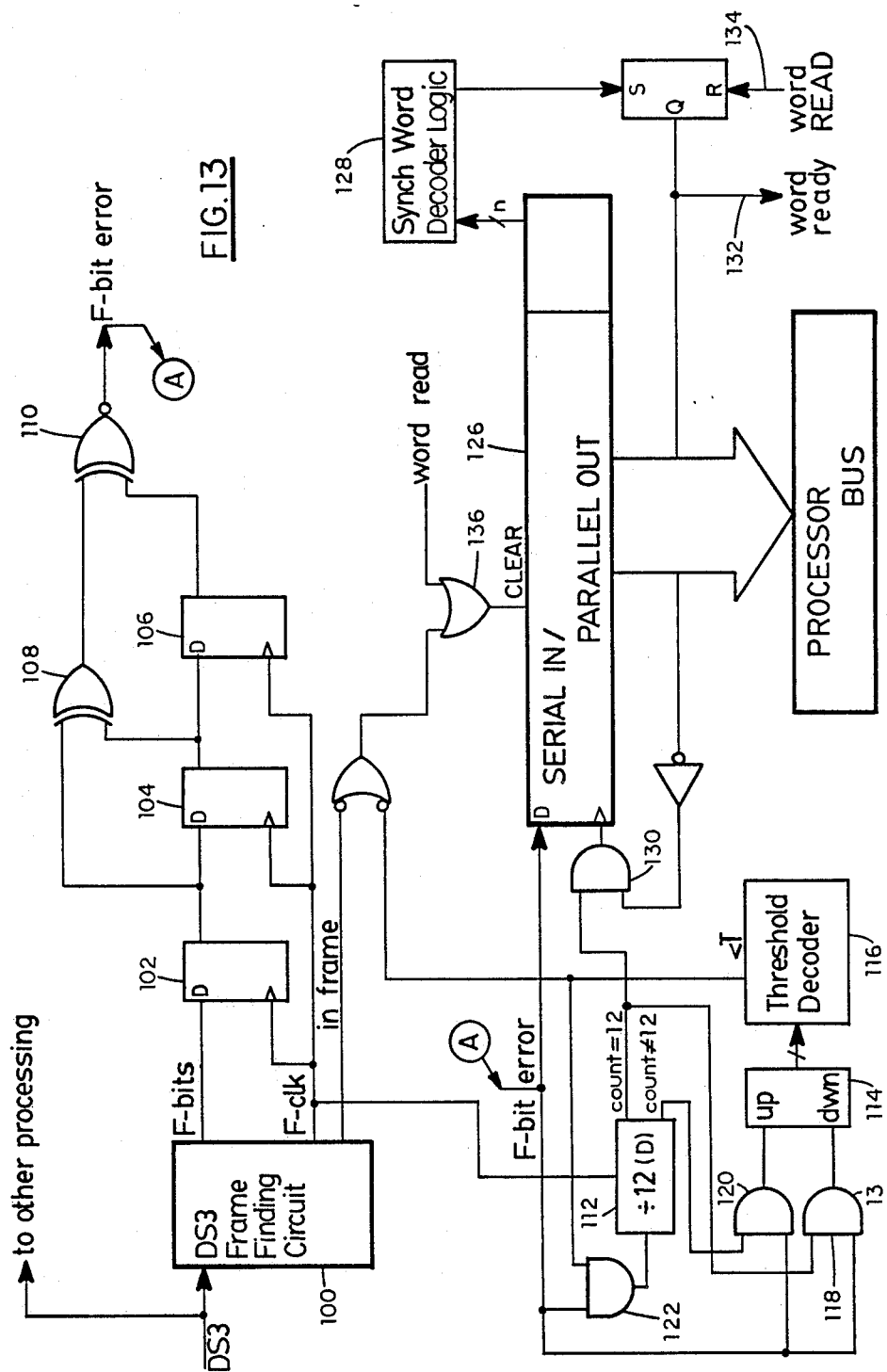
FIG. 13 illustrates an F-bit signalling demodulation circuit.

FIG. 13 illustrates a basic F-bit signalling demodulation circuit and an example of a asynchronous signalling circuit using the derived F-bit channel. A DS3 F-bit frame finding circuit 100, of which several circuits are known, is used to locate the DS3 F-bits and produce a regular clock indicating the timing of the F-bits. The existing frame finding circuit also produces an indication of its own state so that, when not in frame, spurious F-bit signalling will not be decoded. All of these signals exist in known DS3 F-bit framing designs and simply need to be made available to the demodulation circuit to demodulate F-bit signalling.

Delay Flip Flop stages 102, 104 and 106 are used to examine successive triplets of F-bits from the framing circuit to locate F-bit errors. This is achieved through EXCLUSIVE OR gates 108 and 110 since the function $F_2 + F_{i-2} + F_{i-2}$ will detect any violation of the pattern . . . 100110011001 . . . , the correct F-bit pattern. This decoded F-bit error signal will include the desired signalling F-bit errors plus possible errors due to transmission errors. Counters 112, 114 and decoder 116 plus miscellaneous gates 118, 120 and 122 form a phase locking subcircuit which selectively locks onto the phase of the desired D-spaced F-bit signalling errors and rejects an arbitrary number (T) of F-bit errors that may arrive out of this phase.

When a $\div 12$ counter 112 is in a given phase, F-bit errors that arrive coincident with the $\div 12$ phase cause counter 114 to increment one step. Counter 114 will saturate at its maximum value, if reached, and not ripple back to zero. F-bit errors arriving out of phase cause counter 114 to decrement its value. If sufficient F-bit errors arrive out of phase with the current $\div 12$ phase, counter 114, a non-rippling up/down counter, will eventually decrement below some threshold value T and the decoder 116 will indicate $<T$ true. When signal $<T$ is true, F-bit error arrivals are permitted, through gate 122, to reset the phase of the $\div 12$ counter 112. The overall action of this circuit is, therefore, to synchronize itself to the regular D-spaced F-bits that carry signalling modulation and to then reject any intervening F-bit errors that may infrequently occur due to the line transmission errors. In this way, a robust recovery of the timing of the desired signalling-carrying F-bits is achieved.

The F-bit error signals, from 110, and the F-bit count=12 signalling clock, from 112, and the circuitry to generate them, embody a basic F-bit signalling receiver/demodulator (physical communications layer). These two signals comprise a general CLK & DATA Serial output over which could be implemented any number of link-level signalling formats and protocols, a specific one of which is a serial to parallel interface as shown.

The output of AND gate 130 is the clock signal for strobing the F-bit error line into the receiving SERIAL INPUT-PARALLEL OUTPUT register 126. If the register has already received a complete word which has not yet been read by the receiving processor or other data sink (not shown), then further loading of this register will be inhibited (to avoid this limitation, a receiving FIFO buffer with the correct word width could be provided).

If register 126 is not already loaded, waiting to be read, and not cleared by a loss of frame condition in the frame finding circuit 100, then successive D-spaced F-bit values are strobed into the receiving register, correct F-bits as 0, F-bit errors as 1's. The preamble sequence of the transmitted word assures that the $\div D$ counter 112 is synchronized before the data begins. The preamble is then followed by the synch word, then the word data itself and then by the checksum or parity bit(s). The total size of the receiving SERIAL INPUT-PARALLEL OUTPUT register is equal to the complete transmitted message, less the preamble which does not stay in register 126. When the synch word is detected by decoder 128, the desired message is completely present in the buffer. Further shifting-in is stopped through gate 130 and a WORD-READY flag 132 is set to alert the processor or data-receiving interface that a message element is received.

After reading the parallel data, the processor strobes the WORDREAD line 134 to re-enable the receiving register and clear it through gate 136, so that during the subsequent shifting-in of another word, the chance appearance of the synch pattern in the previous data word will not cause false word identification by decode circuit 128.

As indicate earlier, the ES-3 signal format (FIG. 1) contains both primary and secondary framing bits. The primary of F-bits have been discussed at length hereinabove. The secondary framing bits, $M_0$, $M_1$, $M_0$, are referred to a masterframe bits and can also be used to convey an auxiliary signalling channel in a manner that is obvious from the case of F-bits undergoing continuous modulation and gated burst modulation.

As with the F-bits, each DS-3 receive implementation will include some rejection capability against isolated M-bit errors and will have some persistence criterion for initial determination of valid M-frame detection. Therefore, a state machine for the M-bit detection similar in principle to that of FIG. 2 applies with quantitative variation only from that used for F-bits and a period of vulnerability during reframe validation also exists. Therefore, the entire process of designing a modulation strategy for the M=bits is an obvious extension of the above method for F-bit modulation. Because there are 3 M-bits for every 28 F-bits, and because implementation details vary more widely for M-bit processing, the signalling capacity of the F-bits is of greater practical interest for general use and, therefore, the analogous development specifically for the M-bits is not presented herein but is considered to fall within the scope of the present invention.

The embodiments of the invention in which an exclusive right or privilege is claimed are defined as follows:

1. A frame-bit modulation circuit for modulating an additional digital signal into a DS3 signal, said DS3 signal being a digital bit stream having F-bit framing bits at predetermined spaced intervals along said bit stream, each said framing bits having a characteristic pattern of bits for use in framing operations to hunt for and locate the true framing bits positions in said bit stream using an in-frame validation criteria of a predetermined number of consecutive framing bit positions having said characteristic pattern, said circuit comprising:

register means for holding a predetermined number of bits of said additional digital signal; and
   means for adding in sequence said digital bits in said register to one of every D framing bits in said digital bit stream to produce a series of modulated framing bits representing said additional digital signal and wherein "D" is a modulation spacing and is an integer greater than said validation criteria, said adding means being operable to add said digital bits in said register only to F-bits occurring within a modulation period of a modulation cycle, said modulation cycle having a non-modulation period within which no F-bits are modified and within which said in-frame validation criteria are satisfied.

2. A circuit as defined in claim 1, said modulation period comprising a first predetermined number of F-bits in said bit stream and said modulation cycle comprising a second predetermined number of F-bits in said bit stream, said second predetermined number being greater than first predetermined number by about 405.

3. A circuit as defined in claim 1, said modulation period comprising a first predetermined number of F-bits in said bit stream and said modulation cycle comprising a second predetermined number of F-bits in said bit stream, said first predetermined number of F-bits being less than or equal to about 280 F-bits and said second predetermined number of F-bits being greater than or equal to about 680 F-bits.

4. A circuit as defined in claim 1, said modulation period comprising a first predetermined number of F-bits in said bit stream and said modulation cycle comprising a second predetermined number of F-bits in said bit stream, said first predetermined number of F-bits being less than or equal to about 350 F-bits and said second predetermined number of F-bits being greater than or equal to about 680 F-bits.

5. A frame-bit modulation circuit as defined in claim 1 further including means for loading said predetermined number of F-bits to be transmitted into said register during said non-modulation period of said modulation cycle.

6. A frame-bit modulation circuit as defined in claim 1, wherein said modulation spacing of said F-bits is greater than or equal to 10 F-bits.

7. A frame-bit modulation circuit as defined in claim 1, wherein said modulation spacing, D, is greater than or equal to K where x-out-of-K is a predetermined F-bit framing error density criterion for out-of-frame detection of said DS3 signal.

8. A frame-bit modulation circuit as defined in claim 1, wherein the duration of said modulation cycle is greater than or equal to about 680 F-bits and intervening bits in said bit stream.

9. A frame-bit modulation circuit as defined in claim 1, wherein the duration of said modulation period is less than or equal to about 350 F-bits and intervening bits in said bit stream.

10. A frame-bit modulation circuit as defined in claim 1, wherein the duration of said modulation period is less than or equal to about 280 F-bits and intervening bits in said bit stream and that of said modulation cycle is greater than or equal to about 700 F-bits and intervening bits in said bit stream and the modulation spacing, D, is greater than or equal to K where x-out-of-K is a predetermined framing error density of said DS3 signal.

11. A frame-bit modulation circuit as defined in claim 1, said register means being a PARALLEL INPUT/SERIAL OUTPUT shift register.

12. A frame-bit modulation circuit as defined in claim 11, said register means including a first register for holding a fixed synch word in a preamble sequence, a second register for holding signaling data and a third register for generating and holding checksum or parity data.

13. A frame-bit modulation circuit as defined in claim 1, said means for serially adding said digital bits including:
- a ÷D counter, where "D" is the modulation spacing, said ÷D counter being adapted to receive an F-bit clock from a DS3 multiplex circuit and produce an output representative of every D-spaced F-bit of said DS3 signal;
- a ÷C counter, where "C" is the cyclewidth of said modulation cycle, said ÷C counter being adapted to receive an F-bit clock from a DS3 multiplex circuit and produce an output count corresponding to every F-bit during said modulation cycle;
- decode logic circuit means adapted to receive the output of said ÷C counter and having a first and a second output, said decode logic circuit means producing a GATE ON signal at said first output during said modulation period of said modulation cycle and a GATE OFF signal at said second output during said non-modulation period;
- first gate means adapted to produce an output upon receipt of said GATE ON signal, a BUFFER LOADED signal when said register is loaded and the output of said ÷D counter; and
- second gate means adapted to transmit an output of said register upon receipt of said output of said first gate means.

14. A frame-bit modulation circuit as defined in claim 13, further including an EXCLUSIVE OR gate for adding said transmitted output of said second gate means to the original F-bits of said DS3 signal whereby to cause an F-bit error in the F-bit pattern of said DS3 signal for each logical 1 of the transmitted data of said register.

15. A frame-bit modulation circuit as defined in claim 14, further including means for producing a WORD SENT signal when the contents of said register has been transmitted.

16. A frame-bit modulation circuit as defined in claim 13, further including means for loading a digital word to be transmitted into said register during said non-modulation period of said modulation cycle comprising processor means responsive to said GATE OFF signal for loading signalling data to be transmitted into said register.

17. A frame-bit modulation circuit as defined in claim 16, said register means including a first PARALLEL INPUT/SERIAL OUTPUT shift register for holding checksum or parity data, a second PARALLEL INPUT/SERIAL OUTPUT shift register for holding signalling data and adapted to receive shifted data for said first shift register and a third PARALLEL INPUT/SERIAL OUTPUT shift register for holding a fixed synch word and a preamble sequence and adapted to receive the shifted output of said second shift register.

18. A frame-bit demodulation circuit for demodulating F-bit errors previously modulated at a predetermined phase into the F-bit channel of a DS3 signal, said circuit comprising:
- means for examining successive triplets of F-bits received from a framing circuit for locating F-bit errors in said F-bit channel of said DS3 signal and outputting a decoded F-bit error signal;
- phase locked circuit means for locking onto said predetermined phase and for rejecting F-bit errors which are out of said predetermined phase;
- output register means for receiving and holding F-bit error signals received in said predetermined phase; and
- means for producing a clock signal corresponding to the phase determined by said phase locked circuit means for strobing said F-bit error signals into said register.

19. A frame-bit demodulation circuit as defined in claim 18, said examining means including:
- first, second and third delay flip flop stages, said first stage being adapted to receive an F-bit signalling data bits and each said stage being adapted to receive an F-bit clock signal from a frame-finding circuit, said second stage being adapted to receive a first stage output, and said third stage being adapted to receive a second stage output; and
- first and second EXCLUSIVE OR gates, said first EXCLUSIVE OR gate being arranged to receive said first and said second stage outputs and produce a first gate output, said second EXCLUSIVE OR gate being adapted to receive said first gate output and said third stage output and output a decoded F-bit error signal.

20. A frame-bit demodulation circuit as defined in claim 18, said phase locked circuit means including:
- a ÷D counter adapted to receive said decoded F-bit error signal for producing a first output when F-bit errors arrive in phase with said phase and a second output when F-bit errors arrive out-of-phase with said phase;
- an UP/DOWN counter adapted to receive said first and second outputs of said ÷D counter, said first output causing said UP/DOWN counter to increment by one step and said second output causing said UP/DOWN counter to decrement by one step, said UP/DOWN counter producing an output representative of the count thereof;
- a threshold decoder adapted to receive the output of said UP/DOWN counter and adapted to produce an output when said UP/DOWN counter output falls below a predetermined threshold;
- a first AND gate adapted to receive said decoded F-bit error signal and said decoder output and output a decoded F-bit error signal when said decoder output is not present and reject F-bits when present.

21. A frame-bit demodulation circuit as defined in claim 20, further including:
a second AND gate adapted to receive said first ÷D counter output and said decoded F-bit error signal and deliver a second gate output to said UP/DOWN counter when said F-bits are in synchronism with said phase, whereby to cause said UP/DOWN counter to increment its count; and
a third AND gate adapted to receive said second ÷D counter output and said decoded F-bit error signal and deliver a third gate output to said UP/DOWN counter when said F-bits are out of synchronism with said phase whereby to cause said UP/DOWN counter to decrement its count;
said second gate output being said clock signal.

22. A frame-bit demodulation circuit for demodulating F-bit errors in the F-bit channel of a DS3 signal, said circuit comprising:
means for examining successive triplets of F-bits received from a framing circuit to locate F-bit errors in said F-bit channel of said DS3 signal and outputting a decoded F-bit error signal, said examining means including first, second and third delay flip flop stages, said first stage being adapted to receive F-bit signalling data bits and each said stage being adapted to receive an F-bit clock signal from a frame-finding circuit, said second stage being adapted to receive a first stage output, and said third stage being adapted to receive a second stage output, and first and second EXCLUSIVE OR gates, said first EXCLUSIVE OR gate being arranged to receive said first and said second stage outputs and produce a first gate output, said second EXCLUSIVE OR gate being adapted to receive said first gate output and said third stage output and output a decoded F-bit error signal;
phase locked circuit means for locking onto the phase of F-bit signalling errors and rejecting an F-bit errors which are out of said phase, said phase locked circuit means including a ÷D counter adapted to receive said decoded F-bit error signal for producing a first output when F-bit errors arrives in phase with the phase of said counter and a second output when F-bit errors arrive out-of-phase with the phase of said counter, an UP/DOWN counter adapted to receive said first and second outputs of said ÷D counter, said first output causing said UP/DOWN counter to increment by one step and said second output causing said UP/DOWN counter to decrement by one step, said UP/DOWN counter producing an output representative of the count thereof, a threshold decoder adapted to receive the output of said UP/DOWN counter and adapted to produce an output when said UP/DOWN counter output falls below a predetermined threshold, a first AND gate adapted to receive said decoded F-bit error signal and said decoder output and output said decoded F-bit error signal when said decoder output is not present and reject F-bits when said decoder output is present;
output register means for holding a true F-bit error signal;
means for producing a clock signal corresponding to the phase determined by said phase locked circuit means for strobing said F-bit error signal into said register;
a second AND gate adapted to receive said first ÷D counter output and said decoded F-bit error signal and deliver a second gate output to said UP/DOWN counter when said F-bits are in synchronism with said phase, whereby to cause said UP/DOWN counter to increment its count, said second gate output being said clock signal; and
a third AND gate adapted to receive said second ÷D counter output and said decoded F-bit error signal and deliver a third gate output to said UP/DOWN counter when said F-bits are out of synchronism with said phase whereby to cause said UP/DOWN counter to decrement its count.

23. A method of modulating an additional digital signal into a DS3 signal, said DS3 signal being in the form of a digital bit stream having primary F-bit framing bits located at predetermined spaced intervals along said digital bit stream, each said framing bits having a characteristic pattern of bits for use in framing operations to hunt for the true framing bit positions in said bit stream using an in-frame validation criteria of a predetermined number of consecutive framing bit positions having said characteristic pattern, said method comprising the steps of:
selectively modifying said characteristic pattern of bits of one of every D-th framing bit in said bit stream to produce a series of modulated framing bits wherein each said modulated framing bit represents a bit associated with said additional digital signal and wherein "D" is a modulation spacing and is an integer greater than said validation criteria, said step of selectively modifying includes modifying only F-bits occurring within a modulation period of a modulation cycle, said modulation cycle having a non-modulation period within which no F-bits are modified and within which said in-frame validation criteria are satisfied.

24. A method as defined in claim 23, wherein said step of selectively modifying includes causing an error in said characteristic pattern of a framing bit when the digital bit associated with said additional digital signal is a logical 1 and causing no error in said characteristic pattern of a framing bit when the digital bit associated with said additional digital signal is a logical 0.

25. A method as defined in claim 23, said modulation period comprising a first predetermined number of F-bits in said bit stream and said modulation cycle comprising a second predetermined number of F-bits in said bit stream, said second predetermined number being greater than first predetermined number by about 405.

26. A method as defined in claim 23, said modulation period comprising a first predetermined number of F-bits in said bit stream and said modulation cycle comprising a second predetermined number of F-bits in said bit stream, said first predetermined number of F-bits being less than or equal to about 280 F-bits and said second predetermined number of F-bits being greater than or equal to about 680 F-bits.

27. A method as defined in claim 23, said modulation period comprising a first predetermined number of F-bits in said bit stream and said modulation cycle comprising a second predetermined number of F-bits in said bit stream, said first predetermined number of F-bits being less than or equal to about 350 F-bits and said second predetermined number of F-bits being greater than or equal to about 680 F-bits.

28. A method as defined in claim 23, further including the step of loading a plurality of bits of said additional digital signal into a register prior to selectively modifying said F-bits and transmitting said DS3 signal.

29. A method as defined in claim 28, said loading step further comprising loading said plurality of bits of said additional digital signal into said register during said nonmodulation period of said modulation cycle.

30. A method as defined in claim 23, wherein said step of altering said characteristic pattern comprising adding a logical 1 to an F-bit to cause a complement operation on the next outgoing F-bit available for modulation and adding a logical 0 to an F-bit to cause no F-bit error.

31. A method as defined in claim 23, wherein said spacing is greater than or equal to 10 F-bits and intervening bits in said bit stream.

32. A method as defined in claim 23, wherein said spacing is greater than or equal to K where x-out-of-K is a predetermined framing error density criteria employed in said framing operations.

33. A method as defined in claim 23, wherein said spacing is greater than or equal to 13 F-bits and said framing error density criteria is 4-out-of-12.

34. A method of modulating an additional digital signal into a DS 3 signal, said DS3 signal being in the form of a digital bit stream having primary F-bit framing bits located at predetermined spaced intervals along said digital bit stream, each said framing bits having a characteristic pattern of bits for use in framing operations to hunt for the true framing bit positions in said bit stream using an in-frame validation criteria of a predetermined number of consecutive framing bit positions having said characteristic pattern, said method comprising the steps of:

selectively modifying said characteristic pattern of bits of one of every D-th framing bit in said bit stream to produce a series of modulated framing bits wherein each said modulated framing bit represents a bit associated with said additional digital signal and wherein "D" is a modulation spacing and is an integer greater than said validation criteria, wherein said step of selectively modifying includes causing an error in said characteristic pattern of a framing bit when a digital bit associated with said additional digital signal is a logical 1 and causing no error in said characteristic pattern of a framing bit when the digital bit associated with said additional digital signal is a logical 0.

35. A method of modulating an additional signal into a DS3 signal, said DS3 signal being in the form of a digital bit stream having frame-finding F-bits located at predetermined spaced intervals along said digital bit stream, each said frame-finding F-bits having a characteristic pattern of bits of use in framing operations to hunt for and locate the true F-bit positions in said bit stream using an in-frame validation criteria of a predetermined number of consecutive F-bit positions having said characteristic pattern, said method comprising the steps of:

(a) loading a plurality of bits of said additional digital signal into a register during a modulation OFF period of a modulation cycle consisting of a modulation ON period and said modulation OFF period;

(b) sequentially adding, during said modulation ON period of said modulation cycle, said plurality of bits of said additional digital signal to a corresponding number of equally spaced F-bits in said digital bit stream to produce a series of modulated F-bits wherein each said modulated F-bit represents a bit associated with said additional digital signal and wherein the spacing of said number of equally spaced F-bits is greater than said validation criteria;

(c) transmitting said DS3 signal; and (d) repeating steps (a) and (b) until said additional digital signal has been fully modulated into and transmitted with said DS3 signal.

36. A method as defined in claim 35, wherein said spacing is greater than or equal to K where x-out-of-K is a predetermined framing error density criteria employed in said framing operations.

37. A method as defined in claim 35, wherein said spacing is greater than or equal to 13 F-bits and said framing error density criteria is 4-out-of-12.

38. A method as defined in claim 35, said modulation ON period comprising a first predetermined number of F-bits in said bit stream and said modulation cycle comprising a second predetermined number of F-bits in said bit stream, said second predetermined number being greater than first predetermined number by about 405.

39. A method as defined in claim 35, said modulation ON period comprising a first predetermined number of F-bits in said bit stream and said modulation cycle comprising a second predetermined number of F-bits in said bit stream, said first predetermined number of F-bits being less than or equal to about 280 F-bits and said second predetermined number of F-bits being greater than or equal to about 680 F-bits.

40. A method as defined in claim 35, said modulation period ON comprising a first predetermined number of F-bits in said bit stream and said modulation cycle comprising a second predetermined number of F-bits in said bit stream, said first predetermined number of F-bits being less than or equal to about 350 F-bits and said second predetermined number of F-bits being greater than or equal to about 680 F-bits.

41. A method as defined in claim 35, wherein said step of selectively modifying includes causing an error in said characteristic pattern of a framing bit when the digital bit associated with said additional digital signal is a logical 1 and causing no error in said characteristic pattern of a framing bit when the digital bit associated with said additional digital signal is a logical 0.

42. A method of modulating an additional digital signal into a DS3 signal, said DS3 signal being in the form of a digital bit stream having primary M-bit framing bits located at predetermined spaced intervals along said digital bit stream, each said framing bits having a characteristic pattern of bits for use in framing operations to hunt for the true framing bit positions in said bit stream using an in-frame validation criteria of a predetermined number of consecutive framing bit positions having said characteristic pattern, said method comprising the steps of:

selectively modifying said characteristic pattern of bits of one of every D-th framing bit in said bit stream to produce a series of modulated framing bits wherein each said modulated framing bit represents a bit associated with said additional digital signal and wherein "D" is a modulation spacing and is an integer greater than said validation criteria, said step of selectively modifying includes modifying only M-bits occurring within a modulation period of a modulation cycle, said modulation cycle having a non-modulation period within which no M-bits are modified and within which said in-frame validation criteria are satisfied.

* * * * *